United States Patent
Goh et al.

(10) Patent No.: US 11,754,742 B2
(45) Date of Patent: Sep. 12, 2023

(54) SYSTEM AND METHOD FOR INSPECTING A CARGO USING MULTIPLE ENERGY LEVEL RADIATION

(71) Applicant: Billion Prima Sdn. Bhd, Kulai (MY)

(72) Inventors: Chu Leong Goh, Kulai (MY); Yuh Jiunn Lee, Kulai (MY); Joanne Zi En Soh, Kulai (MY); Heng Kwan Tan, Kulai (MY)

(73) Assignee: BILLION PRIMA SDN. BHD, Johor (MY)

( * ) Notice: Subject to any disclaimer, the term of this patent is extended or adjusted under 35 U.S.C. 154(b) by 139 days.

(21) Appl. No.: 17/338,549

(22) Filed: Jun. 3, 2021

(65) Prior Publication Data
US 2022/0066063 A1 Mar. 3, 2022

(30) Foreign Application Priority Data
Aug. 28, 2020 (MY) .............................. PI2020004477

(51) Int. Cl.
*G01V 5/00* (2006.01)
*G08B 21/18* (2006.01)
(Continued)

(52) U.S. Cl.
CPC ......... *G01V 5/0041* (2013.01); *G01G 19/022* (2013.01); *G01V 5/0016* (2013.01);
(Continued)

(58) Field of Classification Search
CPC .. G01V 5/0041; G01V 5/0016; G01G 19/022; G06V 2201/05
See application file for complete search history.

(56) References Cited

U.S. PATENT DOCUMENTS

| | | | |
|---|---|---|---|
| 2011/0176660 A1* | 7/2011 | Morton ................ | G01V 5/0066 378/57 |
| 2011/0274242 A1* | 11/2011 | Linev ..................... | G01V 5/005 378/57 |

(Continued)

FOREIGN PATENT DOCUMENTS

| | | | | |
|---|---|---|---|---|
| AU | 2012254975 A1 * | 12/2012 | ............. | H05H 13/10 |
| WO | WO-2021214442 A1 * | 10/2021 | ............... | G01T 1/24 |

*Primary Examiner* — David P Porta
*Assistant Examiner* — Casey Bryant
(74) *Attorney, Agent, or Firm* — ArentFox Schiff LLP

(57) ABSTRACT

The present invention relates to a system and method for inspecting object using a plurality of interlacing radiation energies. The system comprising a radiation module configured for producing and capturing radiation in multiple energy levels to scan the content of the cargo and converting the captured radiation into a plurality of images; and a controller configured for signalling the radiation module to start or to stop producing radiation and for controlling the energy level and pulse frequency of the radiation produced by the radiation module. The system further comprising a processor configured for determining whether the cargo contains any contraband or not by analysing the plurality of images, classifying the cargo based on types of materials and substance groups and highlighting region on an analysed image of the same substance by bounding perimeter of the object within a material-colour image for the material.

19 Claims, 9 Drawing Sheets

(51) Int. Cl.
*G06V 10/141* (2022.01)
*G06V 10/147* (2022.01)
*G01G 19/02* (2006.01)
*G06F 18/2413* (2023.01)

(52) U.S. Cl.
CPC ...... G01V 5/0083 (2013.01); G06F 18/24137 (2023.01); G06V 10/141 (2022.01); G06V 10/147 (2022.01); G08B 21/182 (2013.01); *G06V 2201/05* (2022.01)

(56) References Cited

U.S. PATENT DOCUMENTS

| | | | | |
|---|---|---|---|---|
| 2016/0153828 A1* | 6/2016 | Kneubühl | ............ | G01G 19/022 |
| | | | | 73/862.625 |
| 2018/0284315 A1* | 10/2018 | Morton | ................ | G01V 5/0066 |
| 2019/0129060 A1* | 5/2019 | Arodzero | ............. | G01V 5/0041 |
| 2019/0137651 A1* | 5/2019 | Bendahan | ............ | G01V 5/0016 |
| 2021/0144839 A1* | 5/2021 | Hori | ..................... | A61N 5/1077 |
| 2021/0302615 A1* | 9/2021 | Bendahan | ............ | G01V 5/0066 |

\* cited by examiner

SYSTEM AND METHOD FOR INSPECTING A CARGO USING MULTIPLE ENERGY LEVEL RADIATION

CROSS REFERENCE TO RELATED APPLICATIONS

The current application claims priority to, and the benefit of, Malaysian Patent Application No. PI2020004477 filed on Aug. 28, 2020, entitled "A SYSTEM AND METHOD FOR INSPECTING A CARGO USING MULTIPLE ENERGY LEVEL RADIATION," the contents of which are hereby incorporated by reference in their entireties.

FIELD OF INVENTION

The present invention relates to a system and method for inspecting object using a plurality of interlacing radiation energies. More particularly, the present invention relates to a system and method for inspecting a cargo to detect contraband using different energy levels of radiation.

BACKGROUND OF THE INVENTION

Imports and exports play an important part in the development and growth of the economy of a country. However, not all goods can be imported or exported, whereby the goods that are imported or exported illegally are known as contraband. Examples of contraband include but not limited to drugs, untaxed cigarettes, and untaxed alcohols. Therefore, there is a need for a system and method for inspecting objects to detect contraband and prevent the contraband from entering or leaving the country's border.

Generally, the goods are imported or exported by using cargos. To inspect the goods in the cargos, normally, authorities use radiography technology to ease the process of inspecting the cargos. During the inspection, radiation such as X-ray and gamma-ray are produced and launched from one side of a machine towards the goods in the cargo. As the radiation pass through the goods, the goods absorb some of the energy carried by the radiation. Thereafter, the radiation is picked up by detectors on the opposite side of the machine. The energy of the radiation is converted into images and displayed for authorities to view and analyse.

Although there are many systems and methods for inspecting a cargo using radiation, most of the systems and methods which is restricted to only a single energy level and thus, such systems and methods are only able to show physical morphology of goods in the cargo in a grayscale representation. The grayscale representation lacks material representation. In a further improvement, systems and methods using dual-energy levels of radiation have been developed.

An example of a system and method for inspecting a cargo using dual-energy levels of radiation is disclosed in a U.S. Pat. No. 7,580,505 B2. The patent relates to a method for inspecting an object using multi-energy radiation and an apparatus thereof. The method comprises the steps of causing multi-energy radiation to interact with an object under inspection, detecting and recording detection values after and interaction between the multi-energy radiation and the object under inspection and substituting a portion of the detection values into a predetermined calibration function to obtain information. The information comprising primary material attribute. Thereon, further material attributes of the object are determined by applying a set of functions suitable for an energy band corresponding to the information.

Another example is disclosed in a U.S. Pat. No. 10,641,918 B2 which relates to methods, apparatus and system for cargo inspection. The system uses technique of extracting two X-ray pulses with lower and higher-energies within a single betatron acceleration cycle.

However, such systems and methods are only able to classify material of the goods. For instance, the systems and methods would only be able to detect whether the cargo contains solid goods or liquid goods but the systems and methods would not be able to further classify whether the liquid goods are alcohol-based liquid or not. Thus, the systems and methods still lacking in precision and accuracy to determine substances that fall under contraband. This would lead to misidentification of contraband in the cargo. Therefore, there is a need for a system and method that address the aforementioned problem.

SUMMARY OF INVENTION

The present invention relates to a system (100) and method for inspecting a cargo using multiple energy level radiation. The system (100) comprises a radiation module (30) having a radiation source sub-module (31) and a data acquisition sub-module (32); and a controller (50) connected to the radiation module (30). The radiation source sub-module (31) is configured to produce radiation that is emitted to the cargo and the data acquisition sub-module (32) is configured to capture the radiation emitted from the radiation source sub-module (31). The controller (50) is configured to trigger the radiation source sub-module (31) to start and stop producing the radiation and control the energy level and pulse frequency of the radiation produced by the radiation source sub-module (31). The system (100) is characterised in that the radiation source sub-module (31) is further configured to produce the radiation in at least three different energy levels in succession; and the data acquisition sub-module (32) is further configured to capture the radiation in at least three different energy levels, convert the captured radiation into an image for each energy level, wherein each pixel value in each image represents the transmittance of the captured radiation in at least three different energy levels. Moreover, the radiation module (30) further comprises a data storage (33) connected to the radiation source sub-module (31). The data storage (33) is configured to store a setup data and lookup table for producing the radiation in at least three different energy levels by the radiation source sub-module (31), wherein the setup data includes a number of the energy levels of the radiation, values of the energy level of the radiation and pulse frequency of the radiation, and wherein the lookup table contains values of expansion phase timing. The system (100) also includes a server (60) connected to the radiation module (30), wherein the server (60) having a processor (61) configured for determining whether the cargo contains any contraband by analysing the image for each energy level.

Preferably, the at least three energy levels of the radiation is in a range between 2.0 MeV to 9.0 MeV with a pulse frequency between 300 Hz to 500 Hz.

Preferably, the system (100) further comprising a radioactive detection module (10) configured to determine whether the cargo contains any radioactive material, and wherein the radioactive detection module (10) is connected to the server (60) to notify the server (60) whenever a radioactive material has been detected in the cargo.

Preferably, the system (100) further comprising a weight sensing module (20) configured to determine a presence of a vehicle carrying the cargo based on weight and number of axles of the cargo, and wherein the weight sensing module (20) is connected to the server (60) and the controller (50) to trigger the radiation module (30) to start or stop scanning the cargo.

Preferably, the weight sensing module (20) includes at least one pair of strip sensors placed onto a surface of a road path to weigh the vehicle with the cargo.

Preferably, the weight sensing module (20) includes a scale (20m) configured to detect the presence of the cargo and measure the weight of the cargo.

Preferably, the system (100) further comprises a display module (90) connected to the server (60), wherein the display module (90) is configured to display an analysed image, data from the radioactive detection module (10) and weight sensing module (20).

Preferably, the radioactive detection module (10), the weight sensing module (20), and the radiation module (30) are installed along a road path for a vehicle carrying the cargo to drive pass.

The method for inspecting a cargo using multiple energy level radiation includes the steps of producing radiation in at least three energy levels in succession by a radiation source sub-module (31), capturing the radiation and converting the captured radiation into a plurality of images based on a number of energy levels by a data acquisition sub-module (32), determining type of materials of the cargo by analysing the plurality of images by a processor (61), and determining type of substance of the cargo by the processor (61).

Preferably, the step of producing radiation in at least three energy levels in succession by the radiation source sub-module (31) includes obtaining setup data of the energy level of the radiation from a data storage (33), wherein the setup data includes number of the energy levels of the radiation, pulse frequency of the radiation, injection current to an accelerating chamber (41) and the magnetic field value supplied to a back magnet circuit (45) as well as an expansion winding (46), and values of voltage to be supplied to a high voltage injection unit (42) by a radiation source sub-module (31). Thereon, the radiation source submodule (31) obtains values of expansion phase timing corresponding to each energy level from the data storage (33) by the radiation source sub-module, wherein the values of expansion phase timing is computed based on magnetic flux, injection current of the expansion winding (46), a voltage of the expansion winding (46), and physical orbital radius and geometry of the accelerating chamber (41). Thereafter, a high voltage injection unit (42) injects the pre-accelerated electrons into the accelerating chamber (41). Once the radiation source sub-module (31) receives an energy level flag, the radiation source sub-module (31) determines the value of the energy level to be produced based on the energy level signal contained in an energy level flag. A power supply unit (31a) and a pulse converter unit (31c) supply current pulses to a contractor winding (47) according to values of current obtained from the data storage (33) to produce radiation with dose rate as determined by the setup data from the data storage (33) and supply current pulses to the expansion winding (46) according to the values of current obtained from the data storage (33) to produce the radiation according to the energy level indicated in the energy level signal.

Preferably, the step of capturing the radiation and converting the captured radiation into the plurality of images based on the number of energy levels by the data acquisition sub-module (32) includes receiving energy level signals from the radiation source sub-module (31) and a controller (50), whereby a first energy level signal comprises low voltage while subsequent energy level signals comprises high voltage, capturing radiation having a particular energy level from the radiation source sub-module (31) and converting the captured radiation pulse into one scan line of the image for the particular energy level for each energy level, and compiling a plurality of scan lines having same energy level to form the plurality of images.

Preferably, the step of determining type of materials of the cargo by analysing the plurality of images by the processor (61) includes performing signal conditioning, selecting a pair of energy levels as a first level filter for material classification, wherein one of the energy levels is represented as a high-energy level while another energy level is represented as a low-energy level. Normalised high-energy level transmission of each pixel of an image produced for the high-energy level, normalised low-energy level transmission of each pixel of an image produced for the low-energy level, and computing a value of function of each pixel are then computed, wherein the value of function refers ratio of high-energy level transmission over the low-energy level transmission. The values of function for all pixels are plotted on pre-generated material classification curves, wherein the material classification curve for each material is generated by plotting the values of function of a sample material on a graph. The pixel values of the object are classified into material groups based on proximity of the plotted values of function to trend lines of the materials on the pre-generated material classification curves.

Preferably, the step of determining type of substance of the object by the processor (61) includes selecting two pairs of energy level combination as a second level filter for substance verification, wherein one of the pair of energy levels is known as a first energy level pair while another pair of energy levels is known as a second energy level pair. The values of function for both first and second energy level pairs for each pixel are then computed and plotted on a plurality of pre-generated substance clusters, wherein each substance cluster is generated by plotting values of functions of the first and second energy level pairs of a sample substance on a graph. The pixel values of the object are classified into corresponding substance groups based on the proximity of the values of function of the first and second energy level pairs to the centre of each of the substance clusters.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

A preferred embodiment of the present invention will be described hereinbelow with reference to the accompanying drawings. In the following description, well-known functions or constructions are not described in detail since they would obscure the description with unnecessary detail.

Figure 1:
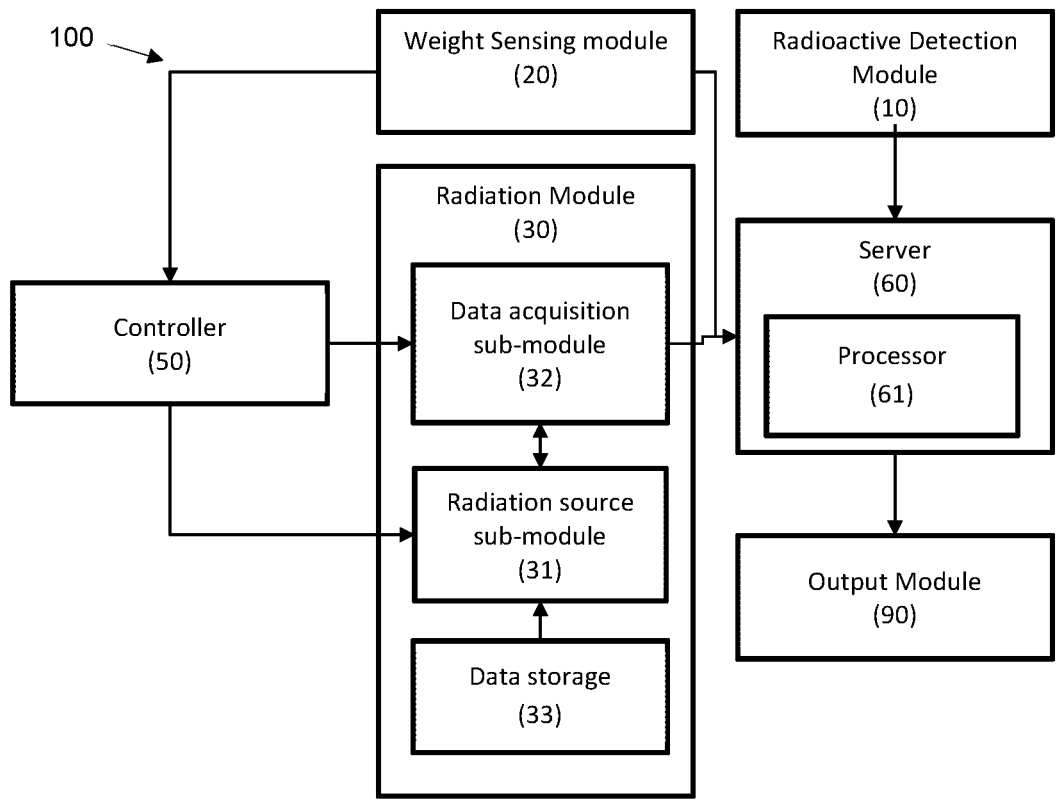
FIG. 1 illustrates a block diagram of a system (100) for inspecting a cargo using multiple energy level radiation according to an embodiment of the present invention.

Initial reference is made to FIG. 1 which illustrates a block diagram of a system (100) for inspecting a cargo using multiple energy level radiation according to an embodiment of the present invention. The system (100) is used to scan the cargo carried by a vehicle such as a lorry and truck. The system (100) comprises a radioactive detection module (10), a weight sensing module (20), a radiation module (30), a controller (50), a server (60) and a display module (90). The radioactive detection module (10), the weight sensing module (20), and the radiation module (30) are installed along a road path for the vehicle carrying the cargo to drive pass, wherein the cargo is autonomously scanned as it passes through the road path. An area where the multi-energy level radiation is emitted to the cargo is referred to as a detection area.

The radioactive detection module (10) is configured to determine whether the cargo contains any radioactive material. The radioactive detection module (10) is preferably installed at an entrance of the road path. The radioactive detection module (10) is connected to the server (60) to notify the server (60) whenever a radioactive material has been detected in the cargo.

The weight sensing module (20) comprises at least one pair of strip sensors placed onto a surface of the road path to weigh the vehicle as the vehicle drives over the strip sensors, wherein each strip sensor in a pair is placed adjacent to each other. Preferably, the weight sensing module (20) is a weigh-in-motion device. The weight sensing module (20) is configured to determine a presence of the vehicle carrying the cargo by measuring weight and detecting a number of axles of the vehicle carrying the cargo. If the weight sensing module (20) comprises more than a pair of strip sensors, the weight sensing module (20) averages the weight detected by each pair of strip sensors to compute the gross weight of the vehicle with the cargo. The weight sensing module (20) detects the number of axles of the vehicle with the cargo by counting the number of times the tyres of the vehicle carrying the cargo drives over the strip sensors. Generally, different axles of the vehicle with the cargo have different weights. The weight detection module (20) sums the weight detected for each axle as the gross weight of the vehicle with the cargo. The weigh detection module (20) is connected to the server (60), whereby the gross weight of the vehicle with the cargo is sent to the server (60) for processing. The detection of the weight and number of axles is to prevent misidentification of an object as a vehicle carrying a cargo or part of a cargo. As a result, such detection prevents the system (100) from scanning objects other than the cargo or the vehicle itself.

The weight sensing module (20) is also connected to the controller (50) to trigger the radiation module (30) to start or stop scanning the cargo. The weight sensing module (20) sends a signal to the controller (50) to trigger the radiation module (30) if any of the strip sensors or both strip sensors in a pair are triggered and when the weight of the cargo exceeds a threshold weight. The weight sensing module (20) also sends a signal to the controller (50) to stop the radiation module (30) from scanning the cargo when the strip sensors are not triggered within a predetermined period. The predetermined period is suitably a period of one electrical relay signal. Thus, the weight sensing module (20) prevents false activation or deactivation of the radiation module (30).

If the weight sensing module (20) includes multiple pairs of strip sensors, the weight sensing module (20) may also be configured to adapt a detection from one pair of strip sensors to send a signal to start scanning the cargo while a detection from another pair of strip sensors to send a signal to stop scanning the cargo. In such case, at least one pair of the strip sensors is installed on the road path before the detection area while another pair of strip sensors is installed on the road path after the detection area.

If there are more than one pair of strip sensors installed before the detection area, the weight sensing module (20) sends a signal to start scanning whenever any pair of the strip sensors is triggered by the tyres of the vehicle based on the preference of an authority such as customs. In this case, each pair of strip sensors are placed at a distance so as one pair of the strip sensors has the time to detect the tyres of the vehicle with the cargo and send the detected weight to the server (60) before another pair of strip sensors detects the tyres of the vehicle with the cargo and sends the detected weight to the server (60). Such distance between one pair of strip sensors to the other pair of strip sensors is calculated based on a speed limit for the vehicle carrying the cargo driving through the road path.

Examples of the installation arrangement of the strip sensors of the weight sensing module (20) on the road path are provided hereinbelow. The examples of the installation arrangement are illustrated in FIG. 3 (a-e), wherein the detection area is represented by a dashed line.

Figure 3A:
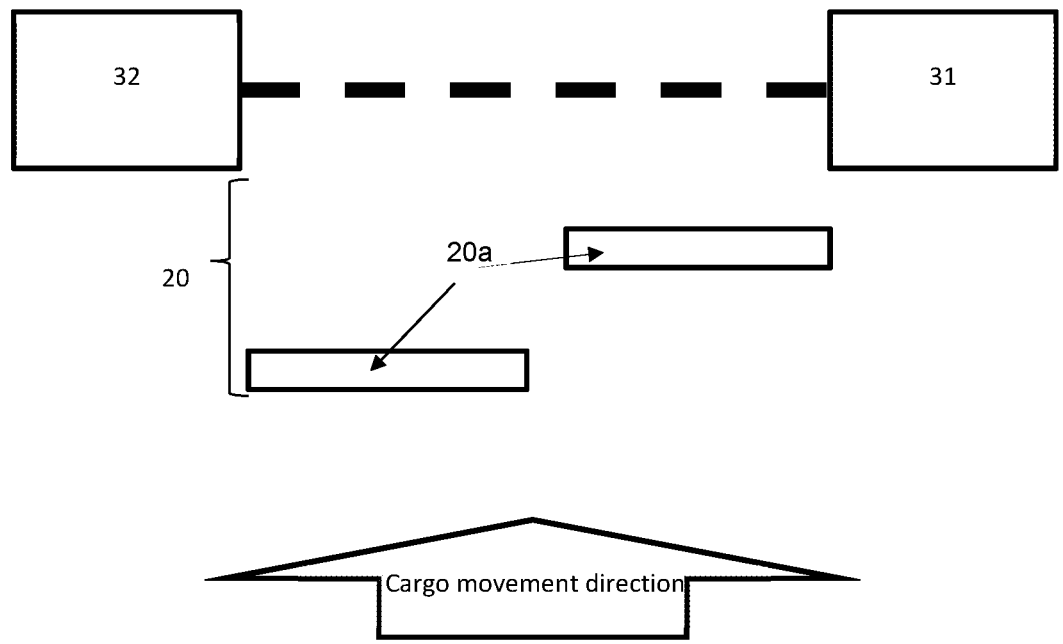
FIGS. 3 (a-e) illustrate examples of installation arrangement of a weight sensing module (20) of the system (100) of FIG. 1.

FIG. 3(a) illustrates a first example of the installation arrangement of a pair of strip sensors (20a) located before the detection area. In this example, the weight sensing module (20) comprises a pair of strip sensors (20a), the strip sensors (20a) are installed in a staggered arrangement. The weight sensing module (20) sends a signal to the controller (50) to activate the radiation module (30) when any one of the strips sensors (20a) detects the tyres of the cargo. The weight sensing module (20) also sends a signal to the controller (50) to stop the radiation module (30) whenever both strip sensors (20a) do not detect any tyres within the predetermined period.

Figure 3B:
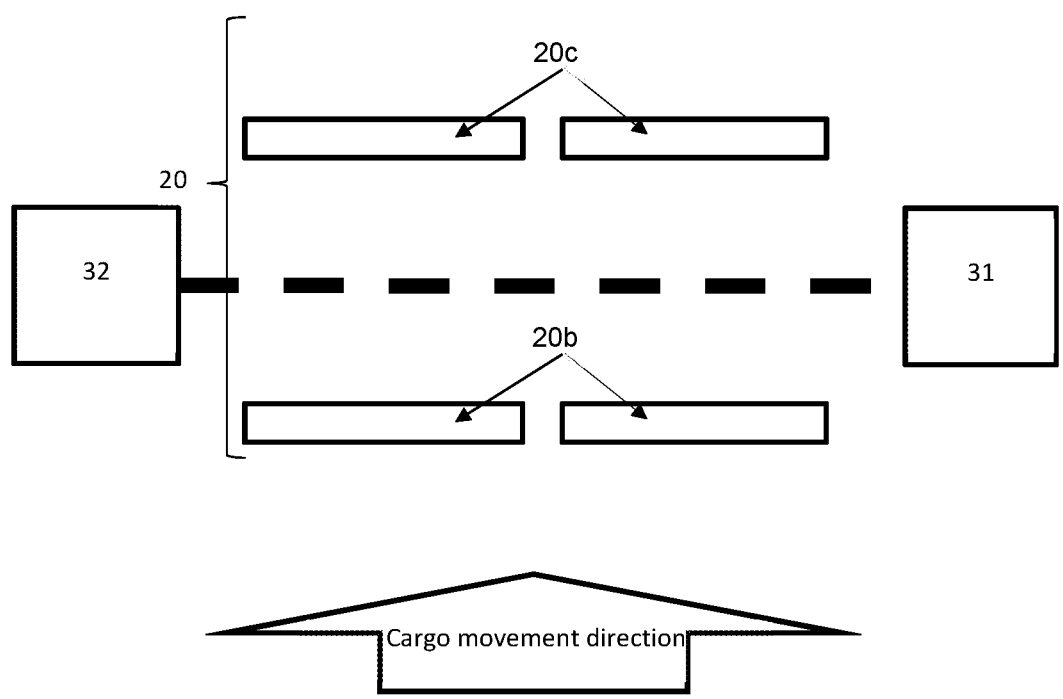

FIG. 3(b) illustrates a second example of the installation arrangement of two pairs of strip sensors (20b 20c), wherein the two pairs of strip sensors (20b 20c) are referred as a first pair of strip sensors (20b) and a second pair of strip sensors (20b). The first pair of strip sensors (20b) is installed before the detection area while the second pair of strip sensors (20c) is installed after the detection area. The weight sensing module (20) sends the signal to the controller (50) to activate the radiation module (30) when the first pair of strip sensors (20b) detects the tyres of the cargo simultaneously. The weight sensing module (20) sends the signal to the controller (50) to stop the radiation module (30) after the second pair of strip sensors (20c) stop detecting a new pair of tyres within the predetermined period.

Figure 3C:
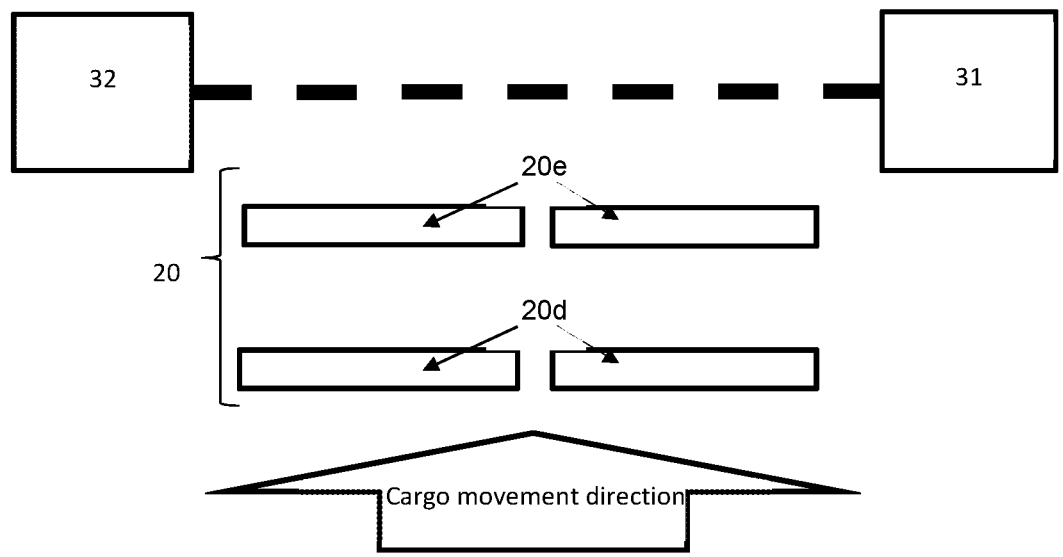

FIG. 3(c) illustrates a third example of the installation arrangement of two pairs of strip sensors (20d, 20e), wherein the two pairs of strip sensors (20b, 20c) are referred as a third pair of strip sensors (20d) and a fourth pair of strip sensors (20e). Both pairs of strip sensors (20d, 20e) are installed before the detection area, wherein the fourth pair of strip sensors (20e) is located nearer to the detection area as compared to the third pair of strip sensors (20d). If the authority wants to inspect the entire cargo including head of the vehicle carrying the cargo, the weight sensing module (20) is configured to send the signal to trigger the radiation module (30) when the third pair of strip sensors (20d) initially detects the tyres of the vehicle simultaneously. On the other hand, if the authority only wants to inspect the content of the cargo, the weight sensing module (20) is configured to send the signal to trigger the radiation module (30) whenever the fourth pair of strip sensors (20e) initially detects the tyres of the cargo simultaneously. Nevertheless, the weight sensing module (20) sends the signal to the controller (50) to stop the radiation module (30) after the third pair of strips sensors (20d) stop detecting any tyres within the predetermined period.

Figure 3D:
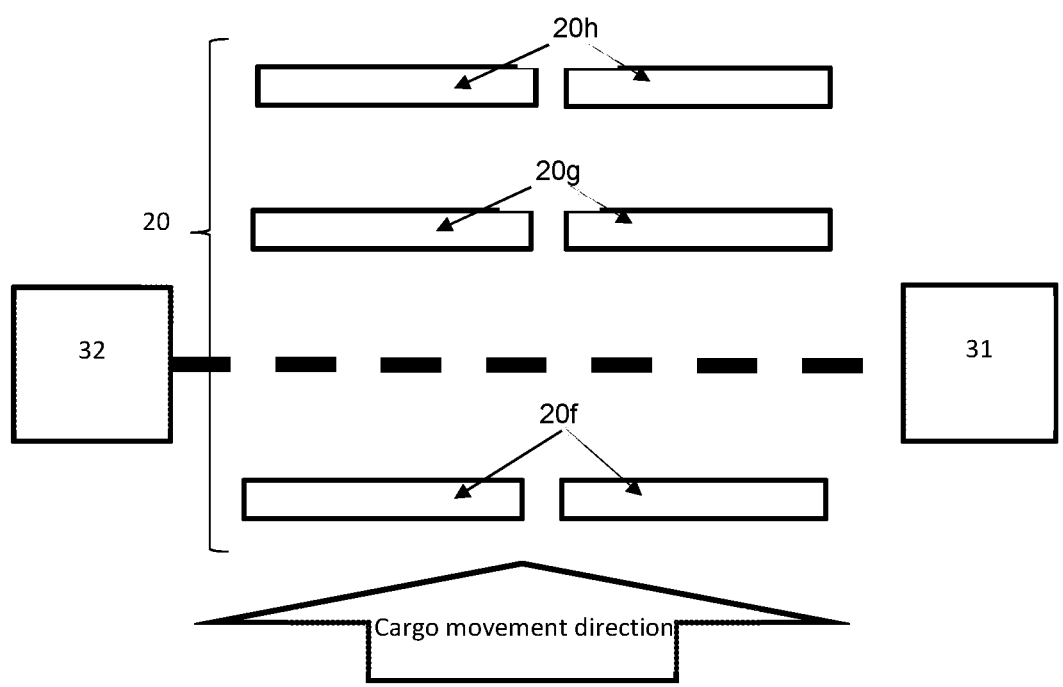

FIG. 3(d) illustrates a fourth example of the installation arrangement of three pairs of strip sensors (20f, 20g, 20h), wherein the three pairs of strip sensors (20f, 20g, 20h) are referred as a fifth pair of strip sensors (20f), a sixth pair of strip sensors (20g) and a seventh pair of strip sensors (20h). The fifth pair of the strip sensors (200 is installed before the detection area while the other two pairs of the strip sensors (20g, 20h) are installed after the detection area. The sixth pair of strip sensors (20g) is installed closer to the detection area compared to the seventh pair of strip sensors (20h). The weight sensing module (20) sends the signal to trigger the radiation module (30) when the fifth pair of strip sensors (20f) initially detects the tyres of the cargo simultaneously. The weight sensing module (20) sends the signal to the controller (50) to stop the radiation module (30) after the cargo exits the system (100) and the sixth pair of strips sensors (20g) stop detecting any tyres within the predetermined period.

Figure 3E:
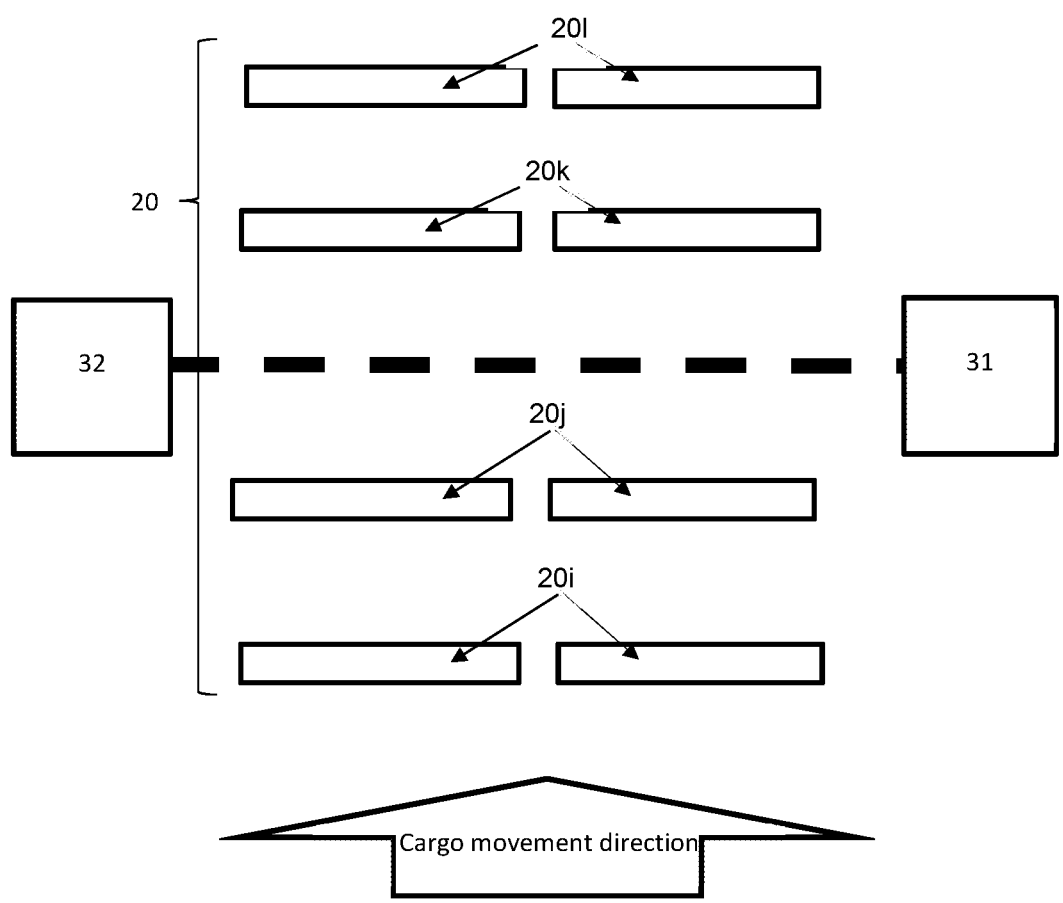

FIG. 3(e) illustrates a fifth example of the installation arrangement of four pairs of strip sensors (20i, 20j, 20k, 20l), wherein the four pairs of strip sensors (20i, 20j, 20k, 20l) are referred as an eighth pair of strip sensors (20i), a ninth pair of strip sensors (20j), a tenth pair of strip sensors (20k), eleventh pair of strip sensors (20l). The eighth and nine pairs of the strip sensors (20i, 20j) are installed before the detection area while the tenth and eleventh pairs of the strip sensors (20k, 20l) are installed after the detection area. The eighth pair of strip sensors (20i) are installed further away from the detection area as compared to the ninth pair of strip sensors (20j). On the other hand, the tenth pair of strip sensors (20k) are installed closer to the detection area as compared to the eleventh pair of strip sensors (20l).

If the authority wants to inspect the entire cargo, including head of the vehicle carrying the cargo, the weight sensing module (20) sends the signal to trigger the radiation module (30) when the eighth pair of strip sensors (20i) initially detects the tyres of the cargo simultaneously. On the other hand, if the authority only wants to inspect the content of the cargo, the weight sensing module (20) sends the signal to trigger the radiation module (30) when the ninth pair of strip sensors (20j) initially detects the tyres of the cargo simultaneously. Nevertheless, the weight sensing module (20) sends the signal to the controller (50) to stop the radiation module (30) after the tenth pair of strip sensors (20k) stop detecting any tyres within the predetermined period.

Figure 4:
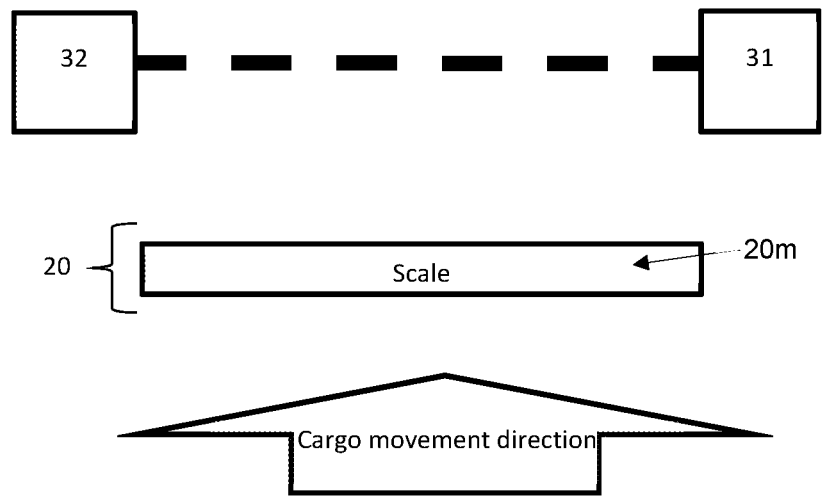
FIG. 4 illustrates an example of an installation arrangement of the weight sensing module (20) of the system (100) in an alternative embodiment of the present invention.

In an alternative embodiment, the weight sensing module (20) comprises a scale (20m) which is installed before the detection area along the road path as shown in FIG. 4. The scale (20m) is configured to detect the presence of the cargo and measure the weight of the cargo to confirm the identity of the cargo based on the weight of the cargo. The weight sensing module (20) sends the signal to trigger the radiation module (30) after the scale (20m) detects the presence of the cargo and determines that the weight of the cargo exceeds the threshold weight to prevent false activation of the radiation module (30).

The radiation module (30) is connected to the controller (50) and the server (60). The radiation module (30) is primarily configured to produce and capture radiation in multiple energy levels to scan the content of the cargo. The radiation module (30) further comprises a radiation source sub-module (31), a data acquisition sub-module (32), and a data storage (33).

The radiation source sub-module (31) is configured to produce the radiation in multiple energy levels in succession in order to examine the content of the cargo. In particular, the radiation source sub-module (31) produces at least three different energy levels of radiation in succession. The radiation source sub-module (31) can either be a betatron, linear accelerator, X-ray generator, or the like. The radiation source sub-module (31) produces X-ray radiation with energy levels between 2.0 mega electron-volt, MeV to 9.0 MeV. It is also preferable for the energy level of the radiation to be increased by 0.5 MeV. Additionally, it is also preferable for the radiation to have a pulse frequency between 300 Hertz, Hz to 500 Hz, whereby an optimum pulse frequency for each radiation of one energy level is approximately 400 Hz. Therefore, the frequency of the radiation having four energy levels is 100 Hz.

Figure 5:
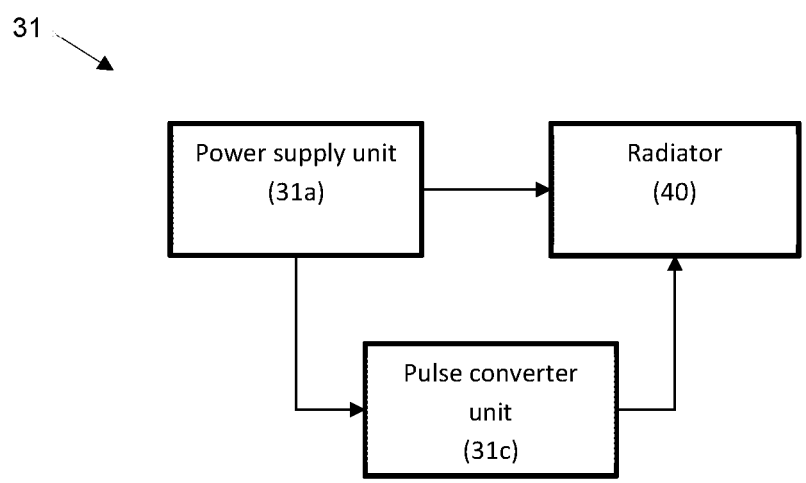
FIG. 5 illustrates a block diagram of a radiation source sub-module (31) of the radiation module (30) of the system (100) of FIG. 1.

Referring to FIG. 5 which illustrates a block diagram of the radiation source sub-module (31), the radiation source sub-module (31) comprises a radiator (40), a power supply unit (31a), and a pulse converter unit (31c). The radiator (40) is electrically connected to the power supply unit (31a) and pulse converter unit (31c).

Figure 6A:
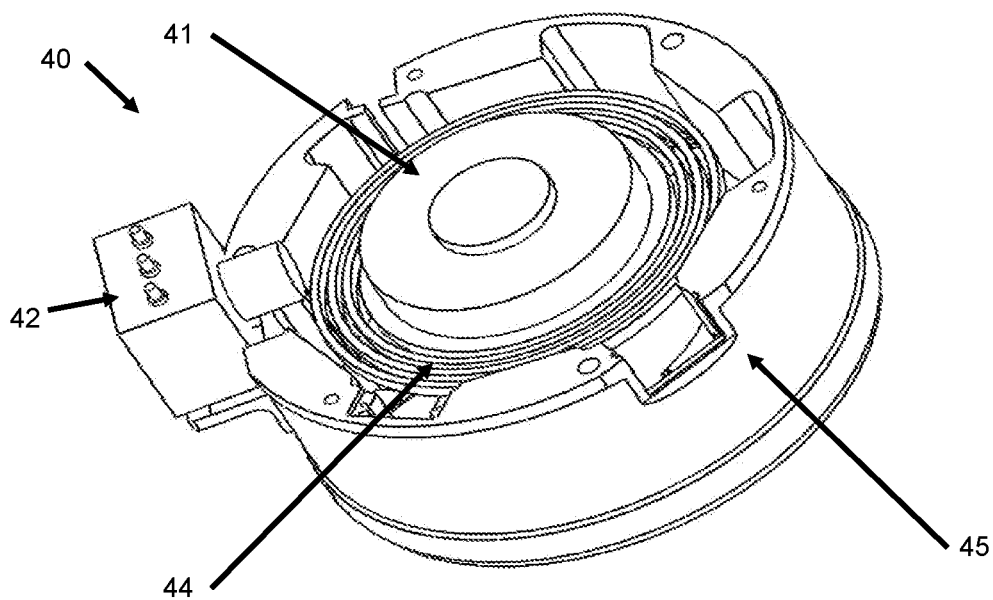
FIG. 6 (a-b) illustrate a cross-section of a radiator (40) of the radiation source sub-module (31) of FIG. 5.
Figure 6B:
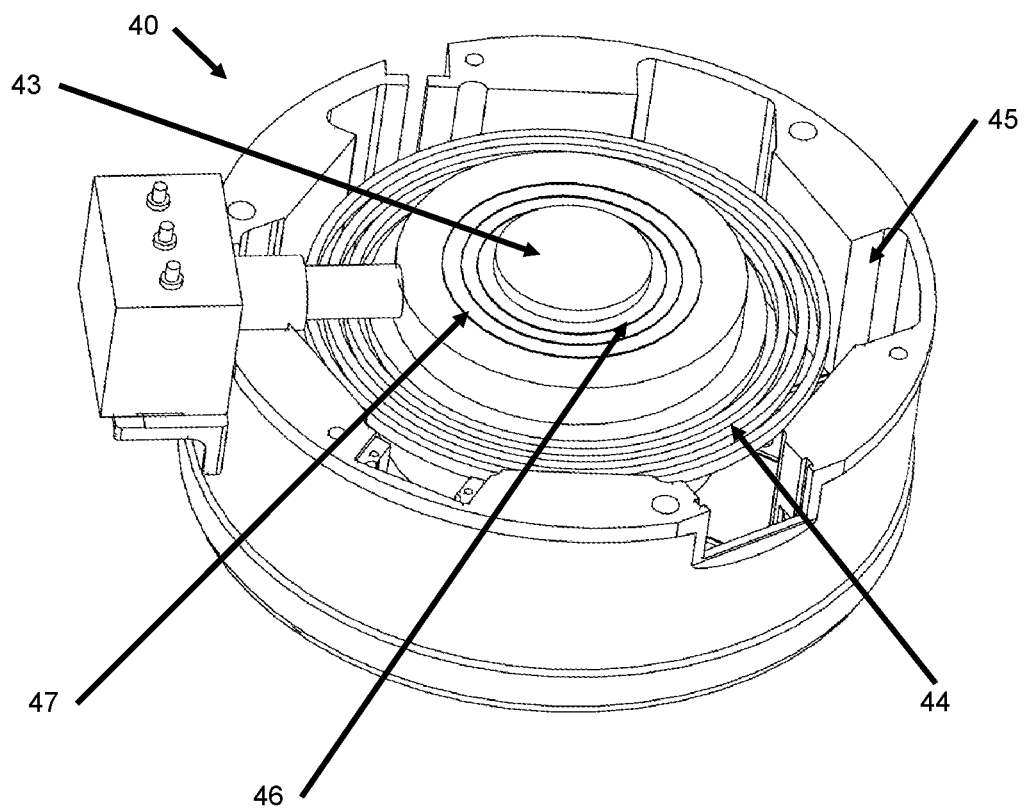

The radiator (40) is a cyclic accelerator in which electrons are moving along a circular trajectory to acquire sufficient energy to harm an eddy electric field to produce the radiation in multiple energy levels. FIGS. 6(a-b) illustrate a cross-sectional diagram of the radiator (40). The radiator (40) comprises an accelerating chamber (41) having a high voltage injection unit (42), a magnet pole (43), a main winding (44), a back magnet circuit (45), an expansion winding (46), and a contractor winding (47).

The radiator (40) is preferably assembled in such a way that the accelerating chamber (41) is located above the main winding (44), expansion winding (46) and contractor winding (47). The accelerating chamber (41) is suitably in a torus-shape. Moreover, a laminating insert is preferably installed at the centre of the accelerating chamber (41) while the magnet pole (43) is preferably installed beneath the laminating insert. The expansion winding (46) encircles the magnet pole (43) while the contractor winding (47) encircles the expansion winding (46). The main winding (44) encircles the contractor winding (47) while the back magnet circuit (45) forms an outer rim of the radiator (40) and encircles the accelerating chamber (41) and the main winding (44).

The high voltage injection unit (42) comprises a thermal emission cathode and a terminal anode, wherein the high voltage injection unit (42) is configured to inject pre-accelerated electrons into the accelerating chamber (41). The thermal emission cathode pre-accelerates the electrons to an energy of 40 kiloelectron Volt, keV before injecting the electrons into a region of equilibrium orbit in the accelerating chamber (41). The high voltage injection unit (42) is further configured to emit the radiation towards the data acquisition sub-module (32) via the terminal anode.

The magnet pole (43) is installed under the accelerating chamber (41), wherein the magnet pole (43) is suitably round in shape. The magnet pole (43) produces a magnetic field that provides motion for the electrons around the circles near the equilibrium orbit in the accelerating chamber (41). The magnet pole (43) together with the back magnet circuit (45) and current supplied by the power supply unit (31*a*) to the main winding (44) produces the eddy electric field. The eddy electric field together with the magnetic field cause the electrons to accelerate. Consequently, the electron energy increases with every revolution as the electrons move along the circular orbit of the accelerating chamber (41).

The expansion winding (46) is configured to provide electron expansion to an internal target. The expansion winding (46) is electrically connected to the power supply unit (31*a*) to receive current pulses supplied by the pulse converter unit (31*c*) and increase the radius of the electrons' motion in the accelerating chamber (41). The electrons move along an unfolding spiral and strike a target placed on the terminal anode of the high voltage injection unit (42). When the electrons slowdown in the target, kinetic energy of the electrons is converted into the energy level of radiation that leaves the terminal anode of the high voltage injection unit (42) towards the data acquisition sub-module (32). Therefore, the energy level of radiation is controlled based on current pulses supplied by the pulse converter unit (31*c*) to the expansion winding (46).

The contractor winding (47) is configured to control dose rate of radiation produced by the radiation source module (31) by controlling the number of electrons captured by the terminal anode. The contractor winding (47) is electrically connected to the power supply unit (31*a*), whereby the power converter (42) supplies current pulses to the contractor winding (47). As the current flows through the contractor winding (47), the contractor winding (47) generates an auxiliary pulse magnetic field which changes an instantaneous state of the equilibrium orbit of the accelerating chamber (41). The auxiliary pulse magnetic field also changes a topography of the magnetic field in the radiator (40). As a result, the radiation dose rate may be changed based on the current pulses supplied by the pulse converter unit (31*c*).

The pulse converter unit (31*c*) is connected to the radiator (40) and power supply unit (31*a*), wherein the pulse converter unit (31*c*) is configured to convert an alternating current or AC power supply received from the power supply unit (31*a*) to a direct current or DC power supply control the voltage supplied to the high voltage injection unit (42), and control the current pulses supplied to expansion winding (46) and the contractor winding (47).

The power supply unit (31*a*) is configured to supply electrical power to the radiator (40), wherein the power supply unit (31*a*) includes a plurality of capacitor banks (not shown) and a reservoir capacitor filter (not shown). Each capacitor bank is configured to store electrical energy of approximately around 860 Volts and supply the electrical energy to the radiator (40) during the scanning process. The reservoir capacitor filter is configured to store the electrical energy during a time of surplus energy from the pulse converter unit (31*c*) and discharge the stored electrical energy during a time of shortage of energy to provide a smooth DC power to the radiator (40).

Reference is made back to FIG. 1. The data acquisition sub-module (32) is configured to capture and measure the multiple energy level radiation emitted from the radiation source sub-module (31). Moreover, the data acquisition sub-module (32) converts the multiple energy level radiation into multiple images, whereby a value of each pixel in each image corresponds to an exact point of the cargo under inspection. The data acquisition sub-module (32) produces an image for each energy level, whereby if there are four energy levels of radiation, the data acquisition sub-module (32) produces four images corresponding to the number of energy levels of radiation. Additionally, each pixel value in each image represents the transmittance of the multiple energy level radiation. The data acquisition sub-module (32) is connected to the server (60) to send the images to the server (60) for processing and analysis.

The data acquisition sub-module (32) is connected to the radiation source sub-module (31) and the controller (50). The data acquisition sub-module (32) receives signals from the radiation source sub-module (31) and the controller (50). The data acquisition sub-module (32) compares the signals received from the radiation source sub-module (31) and server (50) to synchronise the radiation source sub-module (31) with the data acquisition sub-module (32).

Figures 2, 2B:
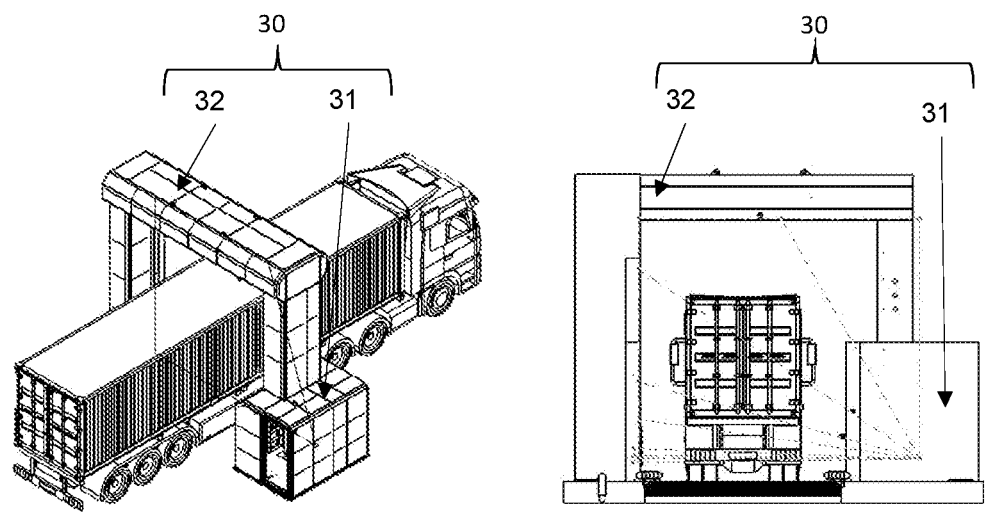
FIGS. 2 (a-b) illustrate a perspective view and a front view of a radiation module (30) of the system (100) of FIG. 1.

The data acquisition sub-module (32) comprises a plurality of detectors, wherein the plurality of detectors is capable to capture bremsstrahlung radiation at different energy levels. As shown in FIGS. 2(*a-b*), the plurality of detectors is preferably arranged in a gateway whereby the plurality of detectors is disposed along a top portion and one side of the gateway and at another side of the gateway across of the radiation source sub-module (31). The plurality of detectors is aligned to capture the radiation emitted from the radiation source sub-module (31) at different angles. As the cargo is driven through the gateway, the plurality of detectors is able to capture the radiation that passed through the cargo at different angles so as to cover every area of the cargo.

The data storage (33) is configured to store a setup data of the multiple energy level radiation, wherein the setup data includes but not limited to the number of the energy levels of the radiation, the values of the energy level of the radiation, injection current setting and the pulse frequency of the radiation. The data storage (33) also stores a lookup table containing values of expansion phase timing. The values of expansion phase timing are computed based on magnetic flux, injection current of expansion winding (46), voltage of expansion winding (46), and physical orbital radius and geometry of the accelerating chamber (41).

The controller (50) is connected to the weight sensing module (20), radiation source sub-module (31) and data acquisition sub-module (32). The controller (50) is configured to trigger the radiation source sub-module (31) to start and stop producing the radiation and control the energy levels and pulse frequency of the radiation produced by the radiation source sub-module (31). The controller (50) triggers the radiation source sub-module (31) to start and stop producing the radiation based on the signal received from the weight sensing module (20).

The controller (50) is configured to send energy level flags to the radiation source sub-module (31), wherein each energy level flag comprises a triggering signal and an energy level signal. The triggering signal is used to initiate the radiation source sub-module (31) to start or to stop producing the radiation. The energy level signal is used to indicate the energy level of the radiation. The controller (50) sends a first energy level flag to the radiation source sub-module (31) to instruct the radiation source sub-module (31) to produce the radiation with the highest energy level, whereby different from other energy level flags, the first energy level flag comprises a low voltage energy level signal. On the other hand, subsequent energy level flag comprises a high voltage energy level signal. The controller (50) sends the subsequent energy level flag to the radiation source sub-module (31) to instruct the radiation source sub-module to produce the radiation with the subsequent energy level. The controller (50) sends the same energy level signals to the data acquisition sub-module (32) so that the data acquisition sub-module (32) may synchronise with the radiation source sub-module (31).

The server (60) is connected to the radioactive detection module (10), weight sensing module (20), data acquisition sub-module (32), and display module (90), wherein the connection may be via a wired connection or wirelessly. The server (60) receives the data from the radioactive detection module (10) and weight sensing module (20) and forwards the data to the display module (90). The server (60) also sends an analysed image to the display module (90) to be displayed by the display module (90).

The server (60) comprises a processor (61) configured to analyse the data received by the server (60). The processor (61) is further configured to classify the cargo based on the types of material. Examples of the types of materials are organic, an intermediate mixture of organic and inorganic, inorganic, and heavy metal. Each type of materials is represented in different colours in the images. The processor (61) is also configured to further classify the cargo into its substance group to determine whether the cargo is contraband or not. The processor (61) highlights the region on the image of the same substance by bounding perimeter of the object within a pseudo-colour image for the substance.

The display module (90) comprises at least one screen preferably installed in a control room at a remote location. The display module (90) is configured to display data from the radioactive detection module (10) and weight sensing module (20) and display the analysed image. Based on the analysed image, further inspection on the cargo may be conducted by the authority.

Figure 7:
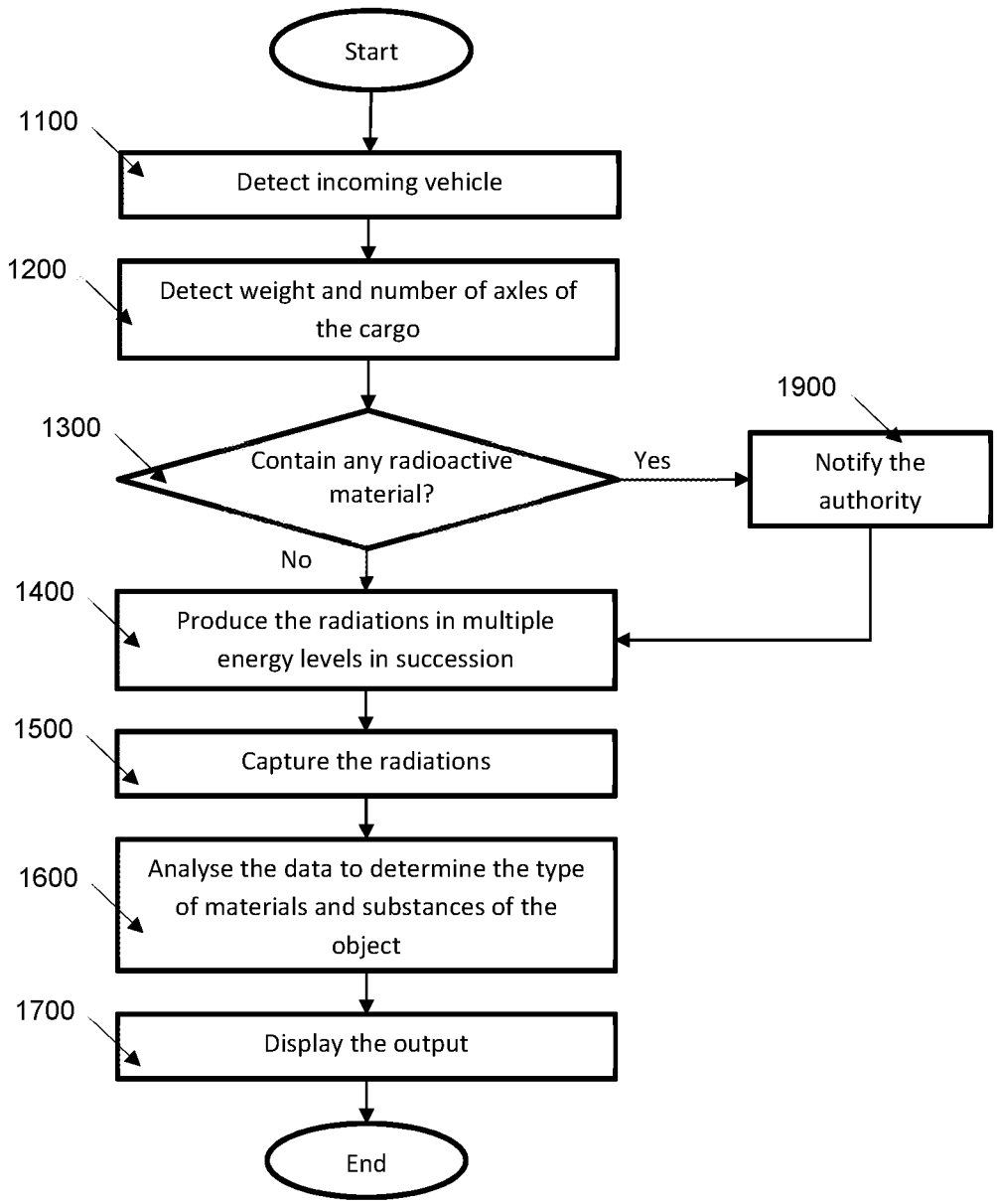
FIG. 7 illustrates a flowchart of a method for inspecting a cargo using multiple energy level radiation according to an embodiment of the present invention.

Reference is now made to FIG. 7 which illustrates a flowchart of a method for inspecting a cargo using multiple energy level radiation according to an embodiment of the present invention. Initially, the weight sensing module (20) detects a presence of the cargo as in step 1100. The weight sensing module (20) confirms the presence of the cargo before sending a signal to the controller (50). The weight sensing module (20) confirms the presence of the cargo when a pair of strip sensors detect the tyres of the cargo. The weight sensing module (20) then further confirms the presence of the cargo by comparing the weight detected by the weight sensing module (20) with the threshold weight of a cargo. If the weight of the cargo exceeds the threshold weight, the weight sensing module (20) sends the signal to the controller (50). If the weight detected by the weight sensing module (20) does not exceed the threshold weight, the weight sensing module (20) treats it as misdetection and discards the detection.

Thereon, the weight sensing module (20) detects the gross weight of the cargo and the number of axles of the cargo as in step 1200. Every time a new pair of tyres hits a pair of strip sensors, the weight sensing module (20) counts it as one axle and detects the pressure applied by the tyres to the strip sensors. The weight sensing module (20) sums the pressure applied by all tyres of the cargo and computes the gross weight of the cargo. If the weight sensing module (20) comprises more than a pair of strips sensors, the weight sensing module (20) averages the weight detected by all pairs of strip sensors to obtain the gross weight of the cargo.

The radioactive detection module (10) determines whether the cargo includes any radioactive material as in step 1300. The radioactive detection module (10) sends the result of the detection to the server (50) to be forwarded to the display module (90). If the radioactive detection module (10) identifies that the cargo includes a radioactive material, the server (50) sends a notification to the display module (90) for the authority to take note as in step 1900.

In step 1400, the controller (50) sends the energy level flags to the radiation source sub-module (31) for the radiation source sub-module (31) to start producing the radiation in multiple interlacing energy levels in succession. Preferably, the radiation source sub-module (31) produces X-ray radiation in at least three energy levels in alternating step-like pulses radiation. Preferably, the radiation source sub-module (31) produces radiation with energy levels between 2.0 MeV to 9.0 MeV, whereby the energy level of the radiation is increased by 0.5 MeV and having the pulse frequency between 300 Hz to 500 Hz. The sub-steps for producing the radiation in multiple energy levels will be further explained in relation to FIG. 8.

In step 1500, the data acquisition sub-module (32) captures the radiation and converts the captured radiation into a plurality of images based on a number of energy levels. The value of each pixel in each image corresponds to an exact point of the cargo under inspection. Additionally, each pixel value in each image represents the transmittance of the multiple energy levels radiation.

In order to ensure that the data acquisition sub-module (32) converts the captured radiation into a correct image for a particular energy level, the data acquisition sub-module (32) has to be synchronised with the radiation source sub-module (31). Therefore, the radiation source sub-module (31) forwards the energy level signals from the energy level flags to the data acquisition sub-module (32). The controller (50) also sends the same energy level signals to the data acquisition sub-module (32).

Once the data acquisition sub-module (32) receives the energy level signals from the radiation source sub-module (31) and controller (50), the data acquisition sub-module (32) determines the energy level of the radiation to be received. After the data acquisition sub-module (32) captures the radiation, the captured radiation pulse is converted into one scan line of the image for the particular energy level. Thereon, the data acquisition sub-module (32) determines whether it has received any new energy level flag from the radiation source sub-module (31). The data acquisition sub-module (32) repeatedly captures the subsequent radiation pulse and converts the radiation into one scan line of the image for each energy level. Thereafter, the data acquisition sub-module (32) compiles the scan lines having the same energy level to form the image of cargo for the particular energy level. The data acquisition sub-module (32) repeats the step of compiling the scan lines having the same energy level until the data acquisition sub-module (32) forms the images of cargo correspond to each energy level produced by the radiation source module (31). The images of cargo for each energy level are transmitted to the server (60) for processing.

The server (60) receives the images from data acquisition sub-module (32).

Thereafter, the processor (61) analyses the images to determine the type of materials and substances of the cargo as in step 1600. The sub-steps for determining the type of materials and substances of the cargo by the processor (61) will be further explained in relation to FIG. 9. Based on the analysed data, the processor (61) determines whether the cargo contains any contraband. As a result of the analysis, the processor (61) generates one image referred as the analysed image, wherein in the analysed image, the processor (61) highlights the region of objects having the same substance by bounding perimeter of the objects within a pseudo-colour image for the material.

Finally, the server (60) sends the analysed image to the output module (90) to be displayed to the authority by the output module (90) as in step 1700. The analysed data displayed by the output module (90) may be used by the authority to monitor the cargo carried by the vehicle.

Figure 8:
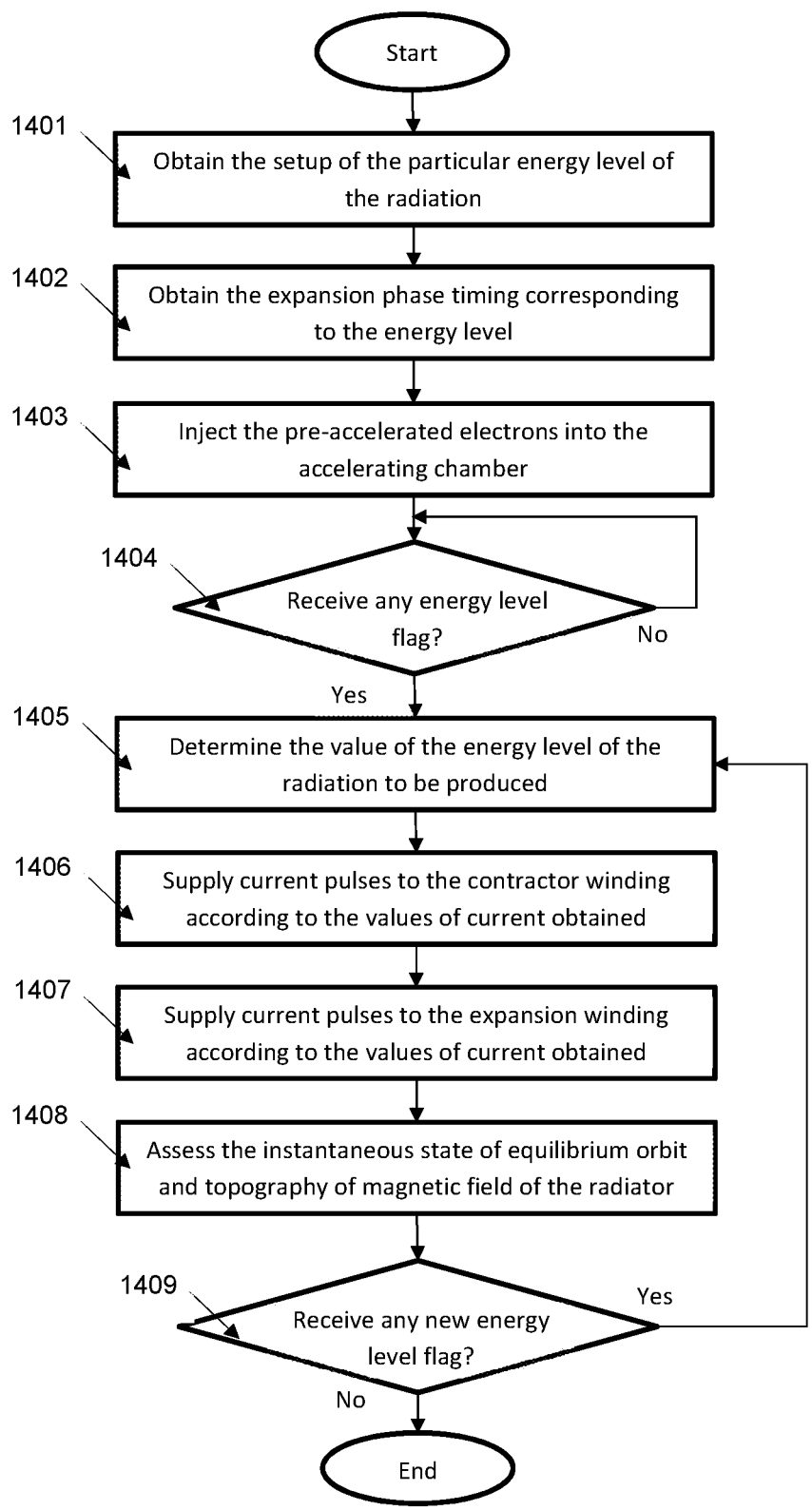
FIG. 8 illustrates a flowchart of sub-steps for producing the radiation in multiple energy levels according to an embodiment of the present invention.

FIG. 8 illustrates a flowchart of sub-steps for producing the radiation in multiple energy levels of step 1400 of the method of FIG. 7. Initially, the radiation source sub-module (31) obtains the setup data of the particular energy level of the radiation from the data storage (33) as in step 1401. The setup data includes but not limited to the number of the energy levels of the radiation, values of the energy level of the radiation, pulse frequency of the radiation, injection current to the accelerating chamber (41) and the magnetic field value supplied to the back magnet circuit (45) as well as the expansion winding (46), and values of voltage to be supplied to the high voltage injection unit (42).

The radiation source sub-module (31) also obtains the values expansion phase timing corresponding to each energy level from the data storage (33) as in step 1402. Preferably, the values of expansion phase timing, f(t) are computed based on the following equation:

$$f(t)=f(\varnothing, I, V, D),$$

wherein Ø represents magnetic flux, I represents injection current of expansion winding (46), V represents voltage of expansion winding (46), and D represents physical orbital radius and geometry of the accelerating chamber (41).

Based on the values of voltage obtained from the data source (33), the high voltage injection unit (42) then injects the pre-accelerated electrons into the accelerating chamber (41) as in step 1403. The electrons move along the accelerating chamber (41) based on motion provided by the magnet pole (43) near the equilibrium orbit in the accelerating chamber (41). The electrons are also accelerated as an effect of the eddy electric field produced by the main winding (44) and the back magnet circuit (45) as well as the magnetic field of the magnet pole (43).

Thereon, the radiation source sub-module (31) waits until it receives the energy level flag from the controller (50) as in decision 1404. Once the radiation source sub-module (31) receives the energy level flag, the radiation source sub-module (31) determines the value of the energy level of the radiation to be produced based on the energy level signal contained in the energy level flag as in step 1405.

The power supply unit (31a) and pulse converter unit (31c) then supply current pulses to the contractor winding (47) according to the values of current obtained from the data storage (33) to produce radiation with the dose rate as determined by the setup data from the data storage (33) as in step 1406. As the current pulses flow through the contractor winding (47), the contractor winding (47) generates the auxiliary pulse magnetic field. The auxiliary pulse magnetic field changes the instantaneous state of equilibrium orbit and topography of the magnetic field of the radiator (40).

Thereafter, the power supply unit (31a) and pulse converter unit (31c) supply current pulses to the expansion winding (46) according to the values of current obtained from the data storage (33) to produce the radiation according to the energy level indicated in the energy level signal as in step 1407. The expansion winding (46) increases the radius of the electrons' motion in the accelerating chamber (41). As the electrons move along the unfolding spiral inside the accelerating chamber (41), the electrons slow down and strike the target placed on the terminal node of the high voltage unit (42). The kinetic energy of the electrons is converted into the energy level of the radiation. The electrons then leave the radiator (40) towards the data acquisition sub-module (32), whereby the electrons having the energy level as indicated in the energy level signal.

The radiation source sub-module (31) sends the energy level signal to the data acquisition sub-module (32) to synchronise the data acquisition sub-module (32) with the radiation source sub-module (31). Thereon, the radiation source sub-module (31) determine whether the radiator (40) achieves the equilibrium state which emits the highest radiation dose rate by assessing the instantaneous state of equilibrium orbit and topography of magnetic field of the radiator (40) as in step 1408. Only if the radiator (40) does not achieve the equilibrium state which emits the highest radiation dose rate, the radiation source sub-module (31) searches for other combination of values of injection current and current pulses for the contractor winding (47). The new combination of values injection current and current pulses for the contractor winding (47) are stored in the data storage (33) for next triggering cycle.

The radiation source sub-module (31) determines whether it receives any new energy level flag from the controller (50) as in step 1409. If the radiation source sub-module (31) receives a new energy level flag, the steps of 1405 until 1408 are repeated until the radiation source sub-module (31) does not receive any new energy level flag from the controller (50).

Figure 9:
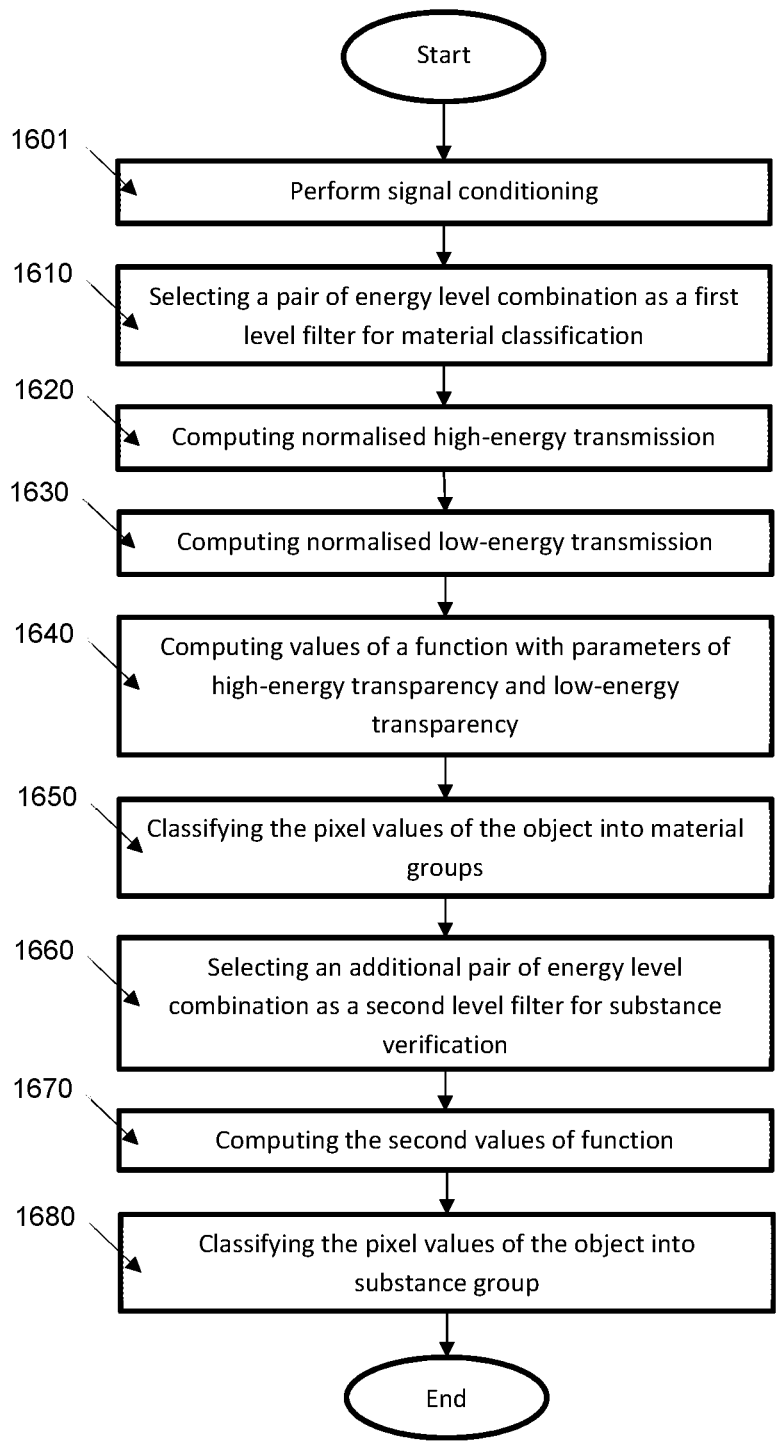
FIG. 9 illustrates a flowchart of sub-steps for determining type of materials and substances of the cargo according to an embodiment of the present invention.

FIG. 9 illustrates a flowchart of sub-steps for determining the types of materials and substances of cargo by the processor (61) of the step 1600 of the method of FIG. 7. The processor (61) performs signals conditioning as step 1601. The signals conditioning is performed by using the multiple energy transmissions value of the radiation which did not pass through any object and is directly captured by the data acquisition sub-module (32).

The processor (61) suppresses the effect of hardware layout and dose fluctuations through calibration of the scan lines by adjusting and scaling the values of the multiple energy transmission values in accordance with the values of radiation which did not pass through any object. The multiple energy level transmission values are then normalised by dividing intensity value detected of each pixel with the highest possible intensity value. Thereon, the processor (61) further denoises the multiple level energy transmissions values by grouping neighbouring pixels with a pre-set window size. Upon this, a grey representation image of the scanned object is generated.

Afterwards, the processor (61) selects a pair of energy levels as a first level filter for material classification as in step 1610. The pair of energy levels is selected from any possible combinations from the multiple energy level radiation. One of the energy levels is represented as a high-energy level while another energy level is represented as a low-energy level.

The processor (61) then computes normalised high-energy level transmission of each pixel of the image produced for the high-energy level as in step 1620 by dividing the intensity value of the pixel of the image produced for the high-energy level with the highest possible intensity value. The processor (61) also computes normalised low-energy transmission of each pixel of the image produced for the low-energy level as in step 1630. The normalised low-energy transmission is computed by dividing the intensity value of the pixel of the image produced for the low-energy level with the highest possible intensity value.

Thereon, the processor (61) computes a value of function of each pixel as in step 1640, wherein the value of function refers ratio of high-energy level transmission over the low-energy level transmission. The value of function is computed based on the following equation:

$$\text{value of function, } f(x, y) = \left| \frac{\log \text{ normalised high} - \text{energy transmission value}_{(x,y)}}{\log \text{ normalised low} - \text{energy transmission value}_{(x,y)}} \right| \quad (1)$$

The values of function for all pixels are plotted on pre-generated material classification curves. The material classification curve for each material is generated by plotting the values of function of a sample material on a graph, whereby the y-axis represents the values of function while the x-axis represents the normalised high-energy level transmission. A logarithmic curve fitting method is adopted to perform curve-fitting on the values of function of the sample material in order to generate a trend line of the material.

The processor (61) classifies each pixel into its corresponding type of material based on proximity of the plotted values of function to the trend lines of the materials on the pre-generated material classification curves as in step 1650. Examples of the types of materials are organic, an intermediate mixture of organic and inorganic, inorganic, and heavy metal. Each type of materials is represented in different colours in the analysed image. If there are areas of overlapping for the material curve during classification, one material will be prioritised over other materials based on the distance between the values of function to the trend lines of the materials.

Thereafter, the processor (61) selects two additional pairs of energy levels as a second filter for substance verification as in step 1660. The two additional pairs of energy levels are selected from any possible combinations from the multiple energy level radiation. One of the pair of energy levels is known as a first energy level pair while another pair of energy levels is known as a second energy level pair.

The processor (61) computes the values of function for both first and second energy level pairs for each pixel as in step 1670. The steps of computing the values of function for the first energy level and second energy are similar to the steps of 1630 and 1640. For each energy level pairs, the normalised high-energy level transmission and normalised low-energy level transmission of each pixel of the image produced for the high-energy level and low-energy level are computed. Thereon, the processor (61) computes the value of function for both first and second energy level pairs for each pixel based on the equation (1) above.

The values of function for both first and second energy level pairs for each pixel is plotted on a plurality of pre-generated substance clusters. Each substance cluster is generated by plotting the values of functions of the first and second energy level pairs of a sample substance on a graph, whereby the y-axis is represented by the values of function of the first energy level pair while the x-axis is represented by the values of function of the second energy level pair. A K-means clustering algorithm is adopted to determine the centre of a substance cluster.

The processor (61) then further classifies each pixel of the object into corresponding substance groups as in step 1680. The pixels are classified based on the proximity of the values of function of the first and second energy level pairs to the centre of each of the substance clusters. After the pixels are classified into their substance groups, the processor (61) highlights the region on the analysed image of the same substance by bounding perimeter of the object within the pseudo-colour image for the substance.

Although the system is described above as to include the radioactive detection module (10), the weight sensing module (20), the radiation module (30), the controller (50), the server (60) and the display module (90); it is apparent to a person skilled in the art that the system and the method may be modified and adapted to principally include the radiation module (30), and the controller (50). Such modification and adaptation would still achieve the inspection of a cargo using multiple energy level radiation.

While embodiments of the invention have been illustrated and described, it is not intended that these embodiments illustrate and describe all possible forms of the invention. Rather, the words used in the specifications are words of description rather than limitation and various changes may be made without departing from the scope of the invention.

The invention claimed is:

1. A system for inspecting a cargo using multiple energy level radiation comprising:
   a) a radiation module having a radiation source sub-module and a data acquisition sub-module, wherein the radiation source sub-module is configured to produce radiation that is emitted to the cargo, and wherein the data acquisition sub-module is configured to capture the radiation emitted from the radiation source sub-module, and
   b) a controller configured to trigger the radiation source sub-module to start and stop producing the radiation and control the energy level and pulse frequency of the radiation produced by the radiation source sub-module, wherein the controller is connected to the radiation module, characterised in that:
   c) the radiation source sub-module is further configured to produce the radiation pulse in at least three different energy levels in succession;
   d) the data acquisition sub-module is further configured to capture the radiation in at least three different energy levels, convert the captured radiation into an image for each energy level, wherein each pixel value in each image represents a transmittance of the captured radiation in at least three different energy levels;
   e) the radiation module further comprises a data storage connected to the radiation source sub-module, wherein the data storage is configured to store a setup data and lookup table for producing the radiation in at least three different energy levels by the radiation source sub-module, wherein the setup data includes a number of the energy levels of the radiation, values of the energy level of the radiation, injection current setting and pulse frequency of the radiation, and wherein the lookup table contains values of expansion phase timing;
   f) the system further includes a server connected to the radiation module, wherein the server having a processor configured for determining whether the cargo contains any contraband by analysing the image for each energy level; and g) the radiation module is further configured to assess the instantaneous state of the equilibrium orbit and topography of magnetic field of a radiator of the radiation source sub-module.

2. The system as claimed in claim 1, wherein the at least three energy levels of the radiation are in a range between 2.0 MeV to 9.0 MeV with a pulse frequency between 300 Hz to 500 Hz.

3. The system as claimed in claim 1, wherein the system further comprising a radioactive detection module configured to determine whether the cargo contains any radioactive material, and wherein the radioactive detection module is connected to the server to notify the server whenever a radioactive material has been detected in the cargo.

4. The system as claimed in claim 1, wherein the system further comprising a weight sensing module configured to determine a presence of a vehicle carrying the cargo based on weight and number of axles of the cargo, and wherein the weight sensing module is connected to the server and the controller to trigger the radiation module to start or stop scanning the cargo.

5. The system as claimed in claim 4, wherein the weight sensing module includes at least one pair of strip sensors placed onto a surface of a road path to weigh the vehicle with the cargo.

6. The system as claimed in claim 4, wherein the weight sensing module includes a scale configured to detect the presence of the cargo and measure the weight of the cargo.

7. The system as claimed in claim 1, wherein the system further comprises a display module connected to the server, wherein the display module is configured to display an analysed image, data from a radioactive detection module and weight information from a weight sensing module.

8. The system as claimed in claim 1, further comprising a radioactive detection module and a weight sensing module, wherein the radioactive detection module, the weight sensing module, and the radiation module are installed along a road path for a vehicle carrying the cargo to drive past.

9. A method for inspecting a cargo using multiple energy level radiation comprising the steps of:
   a) producing radiation in at least three energy levels in succession;
   b) capturing the radiation and converting the captured radiation into a plurality of images for each energy level;
   c) determining types of materials in the cargo based on the plurality of images, wherein determining the types of materials in the cargo comprises
      i. performing signal conditioning,
      ii. selecting a pair of energy levels as a first level filter for material classification, wherein one of the energy levels is represented as a high-energy level while another energy level is represented as a low-energy level,
      iii. computing a normalized high-energy level transmission of each pixel of an image produced for the high-energy level,
      iv. computing a normalized low-energy level transmission of each pixel of an image produced for the low-energy level,
      v. computing a value of function for each pixel, wherein the value of function refers to a ratio of the high-energy level transmission over the low-energy level transmission, and
      vi. classifying each pixel into a corresponding type of material based on proximity of the values of function to trend lines of materials on a plurality of pre-generated material classification curves, wherein each pre-generated material classification curve corresponds to a type of material; and
   d) determining types of substances in the cargo.

10. The method as claimed in claim 9, wherein the step of producing radiation in at least three energy levels in succession includes:
    a) obtaining setup data of the energy level of the radiation, wherein the setup data includes number of the energy levels of the radiation, pulse frequency of the radiation, injection current to an accelerating chamber and the magnetic field value supplied to a back magnet circuit and an expansion winding, and values of voltage to be supplied to a high voltage injection unit;
    b) obtaining values of expansion phase timing corresponding to each energy level from the data storage by a radiation source sub-module;
    c) injecting pre-accelerated electrons into the accelerating chamber by the high voltage injection unit;
    d) determining a value of the energy level to be produced based on an energy level signal;
    e) supplying current pulses to a contractor winding to produce radiation with dose rate as determined by the setup data; and
    f) supplying current pulses to the expansion winding to produce the radiation according to the energy level indicated in the energy level signal.

11. The method as claimed in claim 10, wherein producing radiation in at least three energy levels in succession further includes the steps of:
    a) determining whether a radiator of the radiation source sub-module achieves an equilibrium state that emits highest radiation dose rate by assessing an instantaneous state of equilibrium orbit and topography of magnetic field of the radiator; and
    b) searching and storing another combination of values of injection current and current pulses for the contractor winding if the radiator does not achieve the equilibrium state.

12. The method as claimed in claim 9, wherein the step of capturing the radiation and converting the captured radiation into the plurality of images for each energy level includes:
    a) receiving energy level signals from a radiation source sub-module and a controller, whereby a first energy level signal comprises low voltage while subsequent energy level signals comprises high voltage;
    b) capturing radiation having a particular energy level from the radiation source sub-module and converting the captured radiation pulse into one scan line of the image for the particular energy level for each energy level; and
    c) compiling a plurality of scan lines having the same energy level to form the plurality of images.

13. The method as claimed in claim 9, wherein performing signal conditioning includes:
    a) suppressing effect of hardware layout and dose fluctuations through calibration of a plurality of scan lines by adjusting and scaling values of the multiple energy transmission values in accordance with values of radiation which did not pass through any object;
    b) normalising multiple level energy transmission values by dividing an intensity value detected of each pixel with a highest possible intensity value; and c) denoising the multiple level energy transmissions values by grouping neighbouring pixels with a pre-set window size.

14. The method as claimed in claim 9, wherein computing normalised high-energy level transmission of each pixel of the image produced for the high-energy level is by dividing an intensity value of the pixel of the image produced for the high-energy level with the highest possible intensity value.

15. The method as claimed in claim 9, wherein computing normalised low-energy level transmission of each pixel of the image produced for the low-energy level is by dividing an intensity value of the pixel of the image produced for the low-energy level with the highest possible intensity value.

16. The method as claimed in claim 9, wherein computing the value of function for each pixel, f(x,y) is based on the following equation:

$$\text{value of function, } f(x, y) = \left| \frac{\log \text{ normalised high-energy transmission value}_{(x,y)}}{\log \text{ normalised low-energy transmission value}_{(x,y)}} \right|.$$

17. The method as claimed in claim 9, wherein determining types in the cargo includes the steps of:
  a) selecting two pairs of energy level combination as a second level filter for substance verification, wherein one of the pair of energy levels is known as a first energy level pair while another pair of energy levels is known as a second energy level pair;
  b) computing the values of function for both first and second energy level pairs for each pixel;
  c) plotting the values of function for both first and second energy level pairs for each pixel on a plurality of pre-generated substance clusters, wherein each substance cluster is generated by plotting values of functions of the first and second energy level pairs of a sample substance on a graph; and
  d) classifying the pixel values of the object into corresponding substance groups based on the proximity of the values of function of the first and second energy level pairs to the centre of each of the substance clusters.

18. The method as claimed in claim 17, wherein the step of computing the values of function for both first and second energy level pairs for each pixel includes:
  a) computing normalised high-energy level transmission of each pixel of an image produced for the high-energy level for both first and second energy level pairs;
  b) computing normalised low-energy level transmission of each pixel of an image produced for the low-energy level for both first and second energy level pairs; and
  c) computing values of function of each pixel for both first and second energy level pairs, wherein the values of function of each pixel, f(x,y) is computed based on the following equation:

$$\text{value of function, } f(x, y) = \left| \frac{\log \text{ normalised high-energy transmission value}_{(x,y)}}{\log \text{ normalised low-energy transmission value}_{(x,y)}} \right|.$$

19. The method as claimed in claim 9, wherein the steps prior to producing radiation in at least three energy level in succession include:
  a) detecting the presence of the cargo by a weight sensing module based on detection of tyres and weight of the cargo;
  b) computing a gross weight of the cargo based on detection of the tyres and number of axles of the cargo by the weight sensing module;
  c) determining whether the cargo includes any radioactive material by a radioactive detection module; and
  d) sending a notification to an output module if the cargo includes a radioactive material.

\* \* \* \* \*